(No Model.)

J. B. CROCKER.
MECHANICAL MOVEMENT.

No. 282,962. Patented Aug. 14, 1883.

Witnesses:
J. Henry Kaiser.
Geo. T. Smallwood.

Inventor:
John B. Crocker

UNITED STATES PATENT OFFICE.

JOHN B. CROCKER, OF ST. LOUIS, MISSOURI.

MECHANICAL MOVEMENT.

SPECIFICATION forming part of Letters Patent No. 282,962, dated August 14, 1883.

Application filed July 10, 1883. (No model.)

*To all whom it may concern:*

Be it known that I, JOHN B. CROCKER, of the city and county of St. Louis, and the State of Missouri, have invented certain new and useful Improvements in Mechanical Movements; and I do declare that the following is a full, clear, and exact description thereof, reference being had to the accompanying drawings, and to the letters of reference marked thereon, forming a part of this specification.

The nature of my invention consists in a mechanical movement, the object of which is to increase speed in machinery without any material increase of power. This object is attained by a simple device for combining wheels and series of wheels, as illustrated in the annexed drawings.

Figure 1:
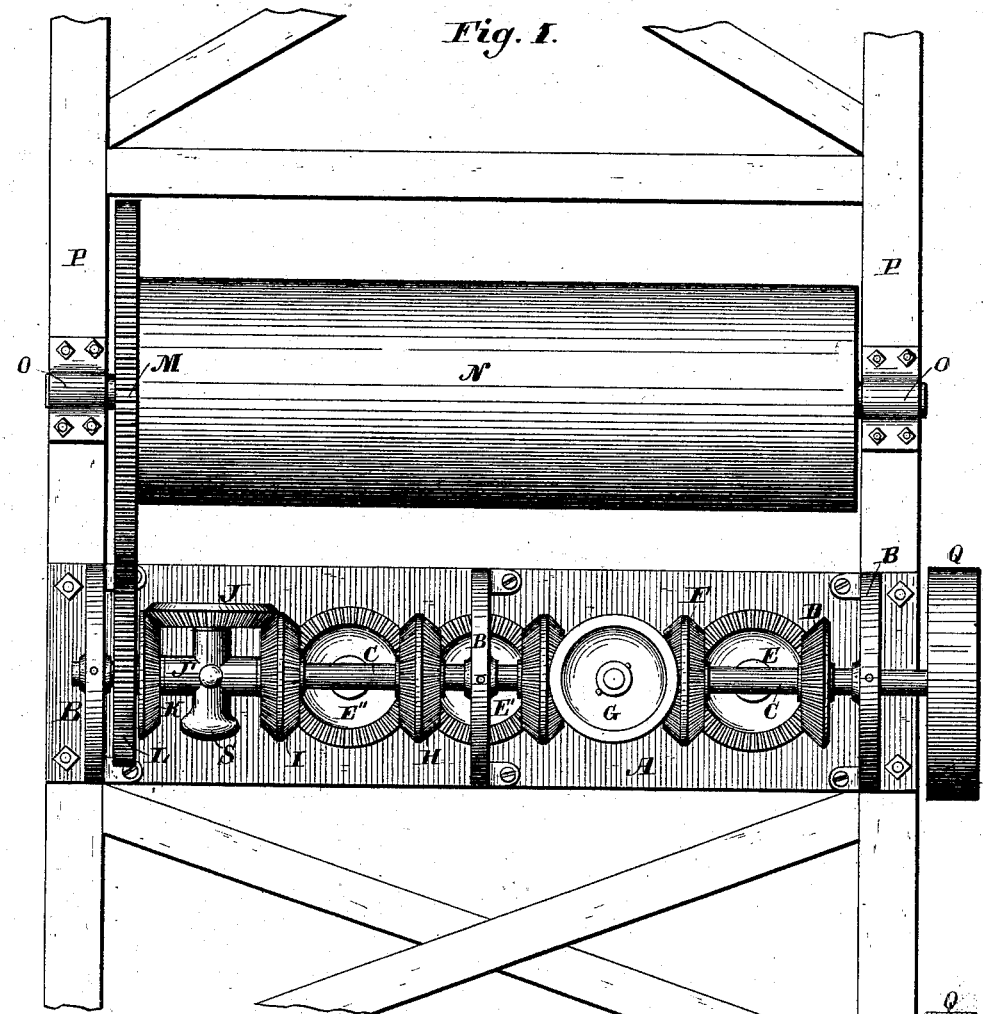
Figure 2:
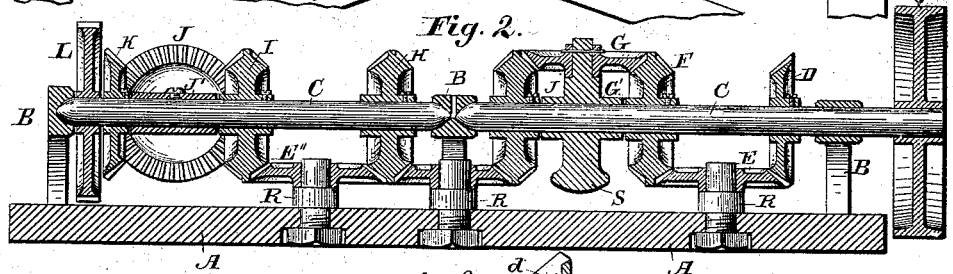
Figure 3:
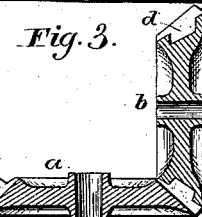

Figure 1 is a top elevation of my invention. Fig. 2 is a longitudinal vertical section. Fig. 3 is a vertical section of two wheels.

A represents an iron plate pierced with a sufficient number of holes to receive the studs R R R, so as to allow the nuts to be screwed on their ends from the under side of the plate in such a manner as to hold them firmly in position. The shoulders of the studs form bearings on the plate, and their other ends are prepared to receive the wheels E E′ E″, and upon which they rest and revolve. The plate also constitutes a base or foundation for the straddles B B B, which are firmly affixed thereto and form the bearings for and upon which rests and revolves the shaft C C. The shafts terminate in sharp points in order to throw off the heat produced by friction, thus preventing the journals from ever becoming overheated.

To the shaft C is firmly keyed the wheel D, which gears into the wheel E. The double miter-wheel F is placed loosely upon the shaft and on one side gears into the wheel E, and on the other side into the wheels G and J, which rest and revolve upon the transverse axle J′. This axle is constructed from the horizontal arms of the metal cross, the other arms being bored out and made hollow to receive the shaft C, to which it is firmly attached. A second double wheel, the last of this series, is placed loosely on the shaft C, and gears into G and J on the one side and into E′ on the other side. The wheel E′ unites the two series. The last series is a perfect repetition of the first, with the following exceptions: First, the wheel G is left out of the second series of wheels and a corresponding weight of metal is substituted therefor in order to maintain a balance with the wheel J, as shown by S; second, the terminal wheel of the second series, K, is a single miter with a spur-wheel attached, which connects both series of wheels to the drum N through the larger wheel M. All the wheels are held in position by means of collars made fast to the shaft.

*a b* in Fig. 3 represents a vertical section of my new combination-wheels. *c* represents the cog placed in the center of the face of the miter-wheel, and the smooth surface on both sides of the cog represents the plain disk of a friction-wheel. *d* shows the depression and plain surfaces in the corresponding wheel. They mesh into one another similar to the regular cog-wheel. At the same time the friction on the both margins of the wheel deadens all noise and co-operates with the cogs in producing forward movements to the wheels.

To the wheel D or to the pulley Q, the driving-power may be applied, the wheel D, revolving with the shaft, moves wheel E, which in turn moves the double wheel F in an opposite direction from D. The wheels G and J, which revolve on the transverse axle, (which also forms a movable fulcrum,) gear into the opposite side of F and into one side of the terminal wheel of the first series. These wheels G and J, traveling on the periphery of the wheels F, give an accelerated motion of three revolutions to the terminal wheel of this series. This motion is connected or transmitted to the next series of wheels by E′, where it again multiplies itself by three, the wheel K making nine revolutions, and so on *ad infinitum*. Each added series of wheels increases the speed in the geometrical ratio of three, or moves three times faster than the one preceding it.

The iron plate on which the two series of wheels are affixed is firmly bolted to the derrick in order to show one point of its practical application.

Having thus fully described my invention, what I claim as new, and desire to secure by Letters Patent, is—

The combination of a series of wheels, as mounted upon shafts C C and transverse shaft and bed-plate A, substantially as set forth.

In testimony that I claim the foregoing I have hereunto set my hand this 10th day of July, A. D. 1883.

JOHN B. CROCKER.

Witnesses:
ROGER WILLIAMS,
FRANCK H. LOVING.